United States Patent [19]
Katsumori

[11] 3,788,433
[45] Jan. 29, 1974

[54] TELESCOPIC SUSPENSION UNIT

[75] Inventor: Teiji Katsumori, Yokohama, Japan

[73] Assignee: Tokico Limited, Kanagawa-ken, Japan

[22] Filed: June 28, 1972

[21] Appl. No.: 266,963

Related U.S. Application Data

[63] Continuation of Ser. No. 73,833, Sept. 21, 1970, abandoned.

[52] U.S. Cl.................................. 188/314, 188/322
[51] Int. Cl............................................... F16f 9/19
[58] Field of Search ... 188/269, 314, 322; 267/64 R

[56] References Cited
UNITED STATES PATENTS

| | | | |
|---|---|---|---|
| 2,412,885 | 12/1946 | Harmon | 267/64 R |
| 2,661,207 | 12/1953 | Allinquant | 267/64 R |
| 3,469,661 | 9/1969 | Hoffmann et al. | 188/269 |

Primary Examiner—George E. A. Halvosa
Attorney, Agent, or Firm—Sughrue, Rothwell, Mion, Zinn & Macpeak

[57] ABSTRACT

A suspension unit having a hollow cylinder and a hollow rod telescopically received therein is provided with fluid damping means in the end of the rod within the cylinder to control the flow of fluid between the cylinder and the rod. The cylinder and the end of the rod within the cylinder are filled with hydraulic fluid pressurized by a gas in the other end of the rod. The gas and hydraulic fluid may be in contact but to prevent formation of gas bubbles in the fluid a movable separator may be provided in the rod.

7 Claims, 9 Drawing Figures

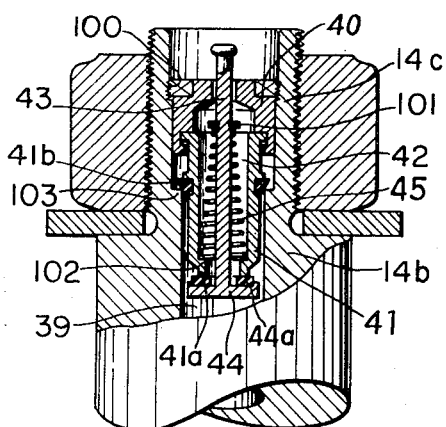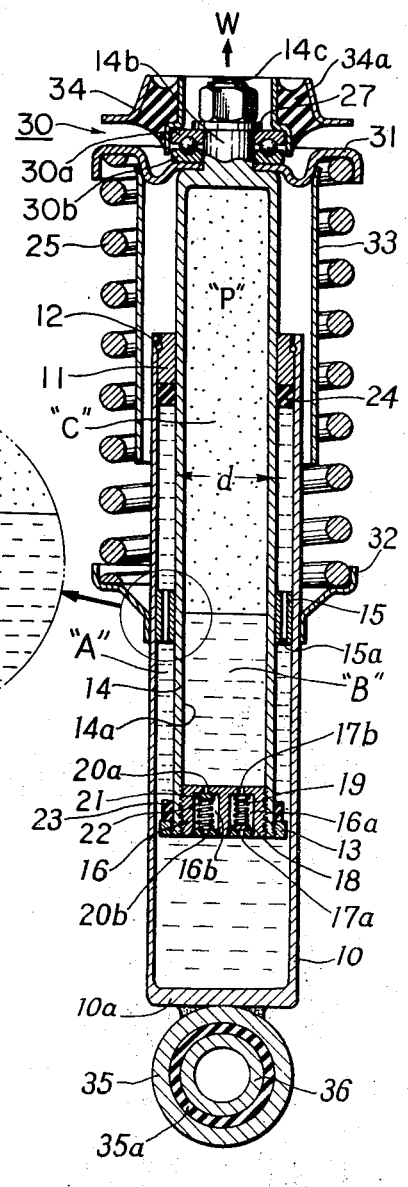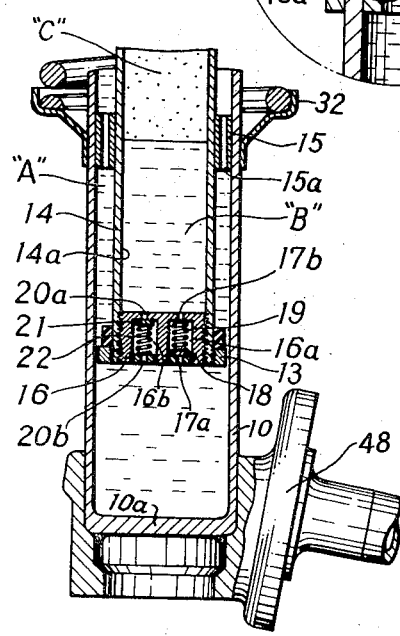

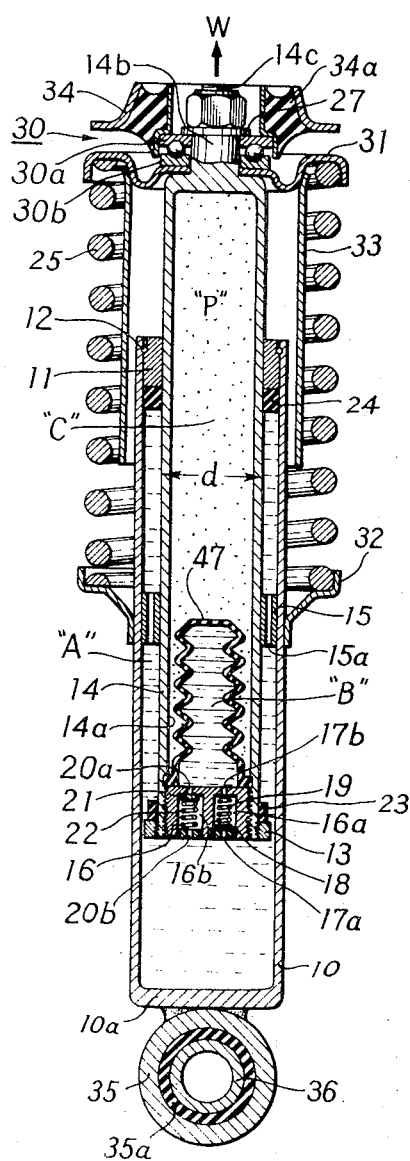
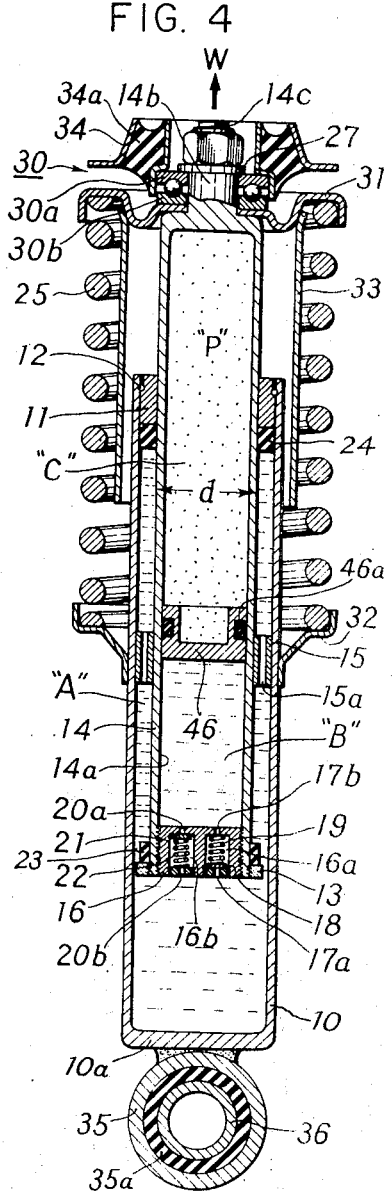

TELESCOPIC SUSPENSION UNIT

This is a continuation, of application Ser. No. 73,833, filed Sept. 21, 1970, now abandoned.

This invention relates to improvements in and relating to a combined hydraulically and pneumatically operated telescopic type suspension unit for an automotive and the like powered vehicle capable of absorbing shocks.

It is an object of the invention to provide a suspension unit of the above type which comprises a sealed gas space adapted for cushioning purpose wherein, however, a relatively low pressure gas contained in said gas space provides a sufficient cushioning force.

A further object is to provide a suspension unit capable of simplifying the sealing means for effective sealing of the contained liquid and gas for effectively preventing disadvantageous leakage of these working media from the interior to the outside of the suspension unit.

A still further object is to provide a suspension unit of the above type, capable of, however, substantially reducing the necessary dimensions of the mechanical auxiliary spring which is attached to the unit.

These and further objects, features and advantages of the present invention will become more apparent when read the following detailed description by reference to the accompanying drawings illustrative of several preferred embodiments of the invention.

In the drawings:

FIG. 1 is an axial section of a first embodiment of the telescopic suspension unit according to the invention, wherein, however, a part of the mechanism encircled by a small circle is reproducedly shown in an enlarged scale encircled by a larger circle.

FIG. 3 is an axial section of a gas pressure-adjusting and changing mechanism shown in an enlarged scale in comparison with the telescopic suspension unit shown in FIG. 1, said pressure-adjusting and changing mechanism being adapted for fitting to all the embodiments of the invention, although not specifically illustrated.

FIGS. 4 and 5 are similar views to FIG. 1, showing axial section of a second and a third embodiment of the invention.

FIG. 6 is part of an axial section of a fourth embodiment of the invention.

Figure 2A:
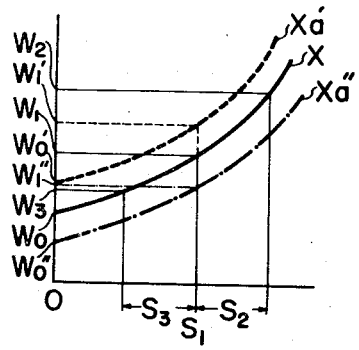
FIGS. 2A, 2B and 2C are several charts illustrative of several different working modes and working plans expressed by S-W diagrams and attainable within the framework of the invention.

Referring now to the accompanying drawings, especially FIG. 1 thereof, the first embodiment of the invention will be described in detail.

In this Figure, the numeral 10 represents a hollow cylinder member, the lower bottom 10a of which is closed as shown, the interior space of said cylinder being filled with a working liquid medium, preferably oil.

The open upper end of the cylinder 10 is normally closed by a first rod guide 11 which is held in position by means of a spring clip 12, while the lower end of said cylinder 10 is permanently closed by means of a bottom 10a which is made integral with the main cylindrical part of the cylinder.

An elongated, substantially hollow rod 14 passes sealingly and axially through the rod guide 11 into the interior space of the cylinder 10, said rod having a slightly smaller outside diameter "d" than the inside diameter of the cylinder 10 and being slidably guided at its intermediate point by means of a second rod guide 15 which is fixedly positioned on the inside wall surface of said cylinder 10 and formed with a plurality of, say, for instance, fluid communication openings 15a concentrically arranged on a circle about the imaginary central axis of the cylinder 10.

The otherwise open lower end of the hollow part 14a of the telescopically slidable rod 14 is substantially closed by a bottom member 16 which is threadedly attached to the hollow rod part 14a, while the upper end part 14b of the rod 14 extending axially and upwardly from the upper closed end of the hollow part 14a is attached fixedly to the upper race 30a of a thrust ball bearing 30 by means of the reduced screw end 14c of the rod through spring washer 27 and a fixing nut 26, said upper race 30a being fixedly attached to a fixture assembly 34 comprising a sandwiched elastic member 34a and being fixedly attached to the chassis, not shown, of a powered vehicle such as an automative car, again not shown. The lower bearing race 30b is fixedly attached to a substantially cup-shaped abutment member 31 which is in turn fixedly attached to the upper closed end of the hollow rod proper 14a. As seen, the upwardly protruding length of the hollow rod proper 14a from the upper end of the cylinder 10 amounts to a considerable length even in the fully collapsed position of the suspension unit shown in FIG. 1. The interior space "A" of the cylinder 10 is filled as shown with a liquid, preferably oil.

The bottom member 16 is formed therein with valve chambers 16a and 16b, having valved fluid passages 17a and 20a and free fluid passages 17b and 20b, respectively. The passages 17a and 20a are normally closed by respective valve members 18 and 21, respectively, which are held in their closed position shown by means of respective springs 19 and 22. Valved passage 17a and free passage 20b are opened towards below, so as to fluidically communicate with the liquid contained in the interior space "A" of the cylinder 10, while valved passage 20a and free passage 17b are opened towards upper, so as to fluidically communicate with the liquid contained in the lower part "B" of the interior space of the hollow rod proper 14a. Therefore, the valve 18 will allow exclusively a fluid flow from the chamber "A" to "B" when it opens. On the contrary, the valve 21 will allow a reverse liquid flow from the chamber "B" to "A" when it opens.

As will become more apparent, the combination of liquid passages 17a; 17b, valve member 18 and spring 19 constitutes a damping force generator against the liquid flow from chamber "A" to "B" caused to develop when the suspension unit is subjected to a forced telescopic contraction. On the contrary, the combination of liquid passages 20a; 20b, valve member 21 and spring 22 constitutes a damping force generator against the liquid flow reversedly from chamber "B" to "A" caused to develop when the suspension unit is subjected to a forced telescopic expansion.

These damper means may take a suitably selected other form. For instance, these may be replaced by corresponding flow-restricting orifices bored through the wall of the hollow rod part 14a in close proximity to said bottom member 16. Or alternatively, or in addition thereto, suitable orifices may be formed through the member 16, although not specifically shown.

The upper remaining part of the interior space of the hollow rod proper 14a constitutes a high pressure gas space "C" charged with a gaseous cushioning medium such as air, nitrogen, carbon dioxide or the like. By the provision of this gas space "C," the liquid contained variably in the chamber "B" is always pressurized.

Numeral 23 represents a damper member which is made preferably of a rubber or the like resilient ring attached fixedly to the lower end of the outside peripheral surface of the hollow rod proper 14a and backed up with a mounting ring 13 threadedly attached to the lower end of the rod 14; said damper member 23 will abut against the rod guide 15, so as to limit the expanding stroke of the suspension mechanism to a predetermined maximum when it performs a telescopic expansion.

A seal packing 24 is provided at the upper end of the cylinder 10 and positioned therein directly below the upper rod guide 11, for the prevension of oil leakage from the interior of the cylinder 10 to outside.

A mechanical suspension coil spring 25 abuts with its upper end against the upper spring mount 31 and abuts with its lower end against a lower spring mount 32 which is fixedly attached to the outer peripheral surface of the cylinder 10 by welding, riveting or the like conventional fixing means, although not specifically shown, and positioned at an intermediate point between the upper and lower ends of the cylinder 10, thus the rod being resiliently urged to move in the telescopically expanding direction of the suspension unit.

By the provision of the antifriction bearing 30, the rod 14 can perform a rotational movement relative to the cylinder 10 and the upper spring mount 31.

A cylindrical dust-proof cylindrical member 33 depends fixedly from the upper spring mount 31 and concentrically to the rod 14 and the cylinder 10.

The lowermost end of the cylinder 10 is fixedly attached with a tubular fixture 35 which is attached in turn resiliently through an intermediate resilient tube 35a to a tubular mount 36, the latter being attached to the housing, not shown, of a wheel axle assembly of the vehicle, although not specifically shown.

It will be easily understood that the rod 14 is of the hollow structure substantially along its whole length, thus having a substantially larger outside diameter, being expressed in FIG. 1 by "d," than that employed in the prior art and capable of providing a substantially increased strength and rigidity against the action of bending moments necessarily applied in use of the telescopic suspension unit.

The operation of the first embodiment so far shown and described is as follows:

It will be easily understood that the high pressure owned by the confined gaseous medium in the space "C" and the mechanical urging force exerted by the suspension spring 25 will in combination provide the rod 14 always with an upwardly directing urging force symbolizingly represented by a small arrow attached with a symbol "W." This urging force "W" may be expressed by the following formula (1):

$$W = W_a \text{ and } W_b \tag{1}$$

where, $W_a$ stands for the pneumatic force; and $W_b$ stands for the mechanical spring force.

Then, $$W_a = \pi/4 \cdot 2^2 \cdot P \tag{2}$$

where, P stands for the pneumatic pressure prevailing in the gas space "C."

From the formulae (1) and (2), we obtain:

$$W = \pi/4 \cdot d^2 \cdot P + W_b \tag{3}$$

In comparison with a conventional comparative telescopic suspension unit having a rigid rod of a smaller diameter "$d_1$" than said "$d$," and with the same pneumatic pressure "P" of the confined gaseous medium, the expanding force W may be correspondingly larger in the case of the improved suspension.

For attaining the same expanding force W, a smaller pneumatic pressure will suffice with the inventive arrangement than in the conventional art employing the rigid rod.

The present suspension unit as in the case of the conventional one, is so designed and arranged that the lower end of the hollow rod will occupy substantially the middle point between the fully collapsed position shown and the fully expanded position where the cushioning ring 23 is brought into contact with the lower end of the sealing member 24, as measured with the carrying vehicle kept stationary. In this case, naturally, the attributed part of the chassis weight is supported by the suspension unit.

When it is now assumed that the gas pressure at this neutral stage is denoted by $P_1$ and the thereby provided expandingly urging force called the initial load is represented by $W_{a1}$ and further that the gas pressure and volume at the maximally extended state of the suspension unit are denoted by $P_0$ and $V_0$, respectively, and the deflection (expressed in terms of the rod stroke) measured from the maximally extended position to the neutral position is expressed by $S_1$, the following relationship will be established:

$$P_1 = \frac{V_0}{V_0 - \frac{\pi}{4} \cdot d^2 \cdot S_1} \cdot P_0 \tag{4}$$

$$W_{a1} = \pi/4 \cdot d^2 \cdot P_1 \tag{5}$$

This axially acting urging force $W_1$ added with a spring force $W_{b1}$ exerted by the spring 25 at the neutral state of the suspension will support the statical loads coming from the chassis side of the vehicle when the latter is maintained in its stopped position.

Thus, $$W_1 = \pi/4 \cdot d^2 \cdot P_1 + W_{b1} \tag{6}$$

When the vehicle is subjected to vibrations during travel thereof, the suspension strut or mechanism may be contracted at a certain time, thereby the suspension spring 25 being further compressed and at the same time the rod 14 will lower from its neutral position further into the interior space "A" of cylinder 10. A part of the thus further pressurized oil in the cylinder space "A", corresponding to the increased displacement volume of the contracting rod, will invade through the now opened passage 17a, valve chamber 16a and free passage 17b, constituting in combination a liquid flow damper as referred to hereinbefore, into the liquid space "B" formed within the hollow rod proper 14a.

In this way, the vibration energy is subjected to a damping action, as is commonly known to those skilled in the art. The effective volume of the gas space "C" is subjected to a corresponding reduction accompanying a corresponding increase of the gas pressure contained therein.

When, on the contrary, the suspension strut is subjected to a return or expansion, it will be clear from the foregoing that the gas pressure is reduced correspondingly.

In this case, the remaining check valve means 20a; 21; 32 and 20b act as the damping force generator, while the valve means 17a; 18; 19 and 17b will act as the check valve per se. Thus, the vibration energy will be subjected also to a damping action.

When it is assumed that the contracting deflection as measured from the neutral to the contracted position of the whole mechanism is represented by $S_2$, the thus increased gas pressure by $P_2$ and the spring force at 25 at this stage by $W_{b2}$, then, $$P_2 = \frac{V_0}{V_0 - \frac{\pi}{4} \cdot d^2(S_1+S_2)} \cdot P_0 \quad (7)$$

$$W_{a2} = \pi/4 \cdot d^2 \cdot P_2 \quad (8)$$

$$W_{b2} = W_{b1} + \alpha S_2 \quad (9)$$

The force acting in the expanding direction with the deflection $S_2$ of the suspension contracted from its neutral position will be expressed by the following formula (10) from (7)–(9).

$$W_2 = (\pi/4 \cdot d^2 \cdot P_2) + (Wb1 + \alpha S_2) \quad (10)$$

Therefore, when the suspension is in its contracted state, the attributed chassis weight is supported by the said force $W_2$ acting in the expanding direction.

With the suspension expanded, the effective volume of the gas space "C" will be increased and the gas pressure prevailing therein will be reduced as referred to above.

When it is assumed that the deflection as measured at this stage from the neutral position be expressed by $S_3$, the gas pressure by $P_3$, the pneumatic force by $W_{a3}$, and the mechanical spring force by $W_{b3}$, respectively. Then, we will obtain:

$$P_3 = \frac{V_0}{V_0 - \frac{\pi}{4} \cdot d^2(S_1+S_3)} \cdot P_0 \quad (11)$$

$$W_{a3} = \pi/4 \cdot d^2 \cdot P_3 \quad (12)$$

$$W_{b3} = W_{b1} - \alpha S_3 \quad (13)$$

From these formulae (11)–(13), the force $W_3$ in the suspension acting in its expanding direction with the extended deflection $S_3$ as measured from the neutral position of the suspension may be expressed:

$$W_3 = (\pi/4 \cdot d^2 \cdot P_3) + (W_{b1} - \alpha S_3) \quad (14)$$

When extended, the suspension will support the attributed chassis weight by this expanding force $W_3$.

Figure 2B:
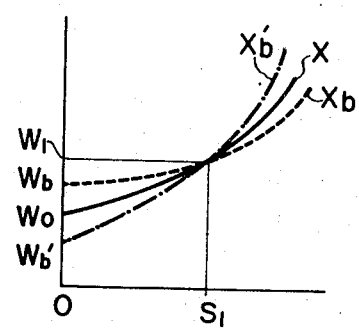
Figure 2C:
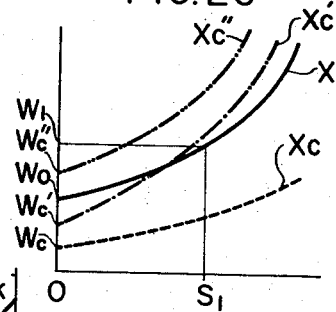

With use of the suspension according to this invention, its S-W characteristic curve can be broadly modified, as will be more clear when read the following description made by reference to FIG. 2 at (A), (B) and (C).

As seen the curve $W_0$ - X in these charts, the overall characteristics are defined by the combination of the non-linear gas spring characteristics defined by the pressure and volume of the gaseous medium confined in the gas space, with the linear characteristics defined by the mechanical suspension spring 25.

With the same suspension spring 25 used without exhange and with the gas pressure and gas volume modified, the characteristics of the suspension will be modified as follows.

In this case, when the gas volume $V_1$ is maintained at a certain constant value and the gas pressure $P_1$ is increased or decreased, as the case may be, the initial or mounting load $W_1$ can be modified in the corresponding way. In this case, the general slope of the characteristic curve may be substantially maintained as before.

For instance, when the gas pressure obtainable with the vehicle kept stationary is increased from $P_1$ to $P_1'$, the initial load will be increased $W_1$ to $W_1'$, as shown in FIG. 2 at (A). When the suspension is subjected to a telescopic expansion or contraction, the S - W characteristic curve will be shifted in a paralled mode from $W_0$ - X to a higher curve $W_0'$ - $X_a'$.

On the contrary, when the gas pressure as measured with the vehicle kept stationary is reduced from $P_1$ to $P_1''$, the initial load will also be reduced from $W_1$ to $W_1''$. When the suspension is subjected to a telescopic movement, the S-W characteristic curve will be shifted from $W_0$ - X to a lower curve $W_0''$-$X_a''$.

When it is desired to keep the initial load $W_1$ unchanged and the general slope of the characteristic curve should be modified, the gas pressure $P_1$ is maintained as before and the gas volume $V_1$ is modified.

For instance, when the gas volume as measured with the vehicle kept stationary is increased from $V_1$ to $V_1'$, the S-W characteristic curve will be modified from said $W_0$ - X to a more gentle curve $W_b$ - $X_b$, as shown in FIG. 2 at (B).

On the contrary, when the gas pressure as measured with the vehicle kept stationary is reduced from $V_1$ to $V_1''$, the S-W characteristic curve will shift from $W_0$ - X to a more steep curve $W_b'$ - $X_b'$ as shown in FIG. 2 at (B).

By modifying both the gas pressure $P_1$ and the gas volume $V_1$ as measured with the vehicle kept stationary, the characteristic curve may be modified from $W_c$ - $X_c$ to $W_c'$ - $X_c'$ or $W_c''$ - $X_c''$ as described to a certain degree, as seen by way of example in FIG. 2 at (C).

For attaining the above purpose, the suspension must be fitted with an adjusting means for modifying the pressure as well as the volume of the confined gaseous medium.

A preferred embodiment of the adjuster of this kind is shown in FIG. 3 by way of example.

In FIG. 3, a longitudinal bore 39 is bored axially of the rod ends 14b; 14c which bore is kept in fluid communication with the interior space of the hollow rod proper 14a, although not specifically shown in FIG. 1 only for avoiding possible confusion.

Two valve body elements 40 and 41 are mechanically coupled with each other so as to provide an assembled hollow valve body, having an axial passage 42 for introducing into or discharging from the hollow interior space of the rod 14 through said axial bore 39 a certain predetermined volume of oil or gaseous medium, as the case may be. This valve body assembly 40-41 is inserted into the bore 39 and held threadedly in position at 100.

An enlongated valve stem 43 is axially slidably mounted in the bore 42 of the valve body assembly, the upper end of said stem, however, protruding a small length from the upper end of the bore 42. The lower end of the stem 43 is formed with a mount 44 on which a resilient valve member 44a formed into a ring made of rubber or the like elastic material is fixedly mounted for normally and sealingly closing the open lower end or valve seat 41a of the lower valve housing element 41. For this valve closing purpose, there is a coil spring 45 mounted under tension between the valve stem and the valve housing and abutting with its end at 101 and 102. The stem 43 is attached fixedly with a sealing ring 41b which abuts normally and resiliently against a stepped shoulder 103 formed on the inside wall surface of the axial bore 39 at an intermediate portion between the both ends, for normally closing tightly the bore passage.

For introducing a gaseous or liquid medium into the inside hollow space of the rod 14, a hose coupling, not shown, is threadedly attached to the upper end of the threaded uppermost portion of rod end 14c and then the valve stem 43 is manually depressed against the action of spring 45.

For discharging the gaseous medium, a similar manipulation may be performed. For discharging the liquid medium, the suspension must be turned up and down for utilizing the gravity action.

FIG. 4 shows a slightly modified embodiment from that shown in FIG. 1. Therefore, for easier and prompt comparison, the respective same or similar parts of the telescopic suspension unit are denoted with respective same reference numerals and symbols. The only difference of the present embodiment from the foregoing resides in the provision of a floating separator piston 46 fitted with a sealing ring 46a for definitely separating the liquid space "B" from the gas space "C", so as to avoid formation of gas bubbles mixed with the liquid contained in the chamber "B."

The operation of the present embodiment is similar to that of the first embodiment shown in FIG. 1 so that no more detailed analysis of the present embodiment would be necessary for understanding of the invention.

FIG. 5 illustrates a further slight modification from that shown in FIG. 1. In this embodiment, respective same or similar parts are shown respective same reference numerals and symbols as before.

The only difference of the present embodiment from the first one resides in the provision of a bellows, like resilient bag 47 closed at its top end and fixedly attached at its bottom to the lower end part of the inside wall of the hollow cylinder proper 14a and directly on the upper surface of the bottom member 16. As seen the interior space of this resilient bag 47 is utilized for the formation of the liquid space "B". The remaining space of the inside interior space of the hollow rod proper 14a less the liquid space "B" occupied by the bag 47 is utilized in this embodiment to form the gas space "C."

The operation of the embodiment shown in FIG. 5 is similar to those of the foregoing embodiments so that no further analysis thereof would be necessary to be given for clear understanding of the invention.

A still further modified embodiment from the first embodiment shown in FIG. 1 is illustrated in FIG. 6. The main structure and operation of the present invention are same as those of the first embodiment, thus respective same reference numerals and symbols are used for demonstrating the respective same or similar constituents of the telescopic suspension unit or strut.

In the present embodiment shown in FIG. 6, a wheel-carrying axle 48 is fixedly attached directly to the lowermost end of the cylinder 10. The operation is thus same as that of the first embodiment.

Figure 7:
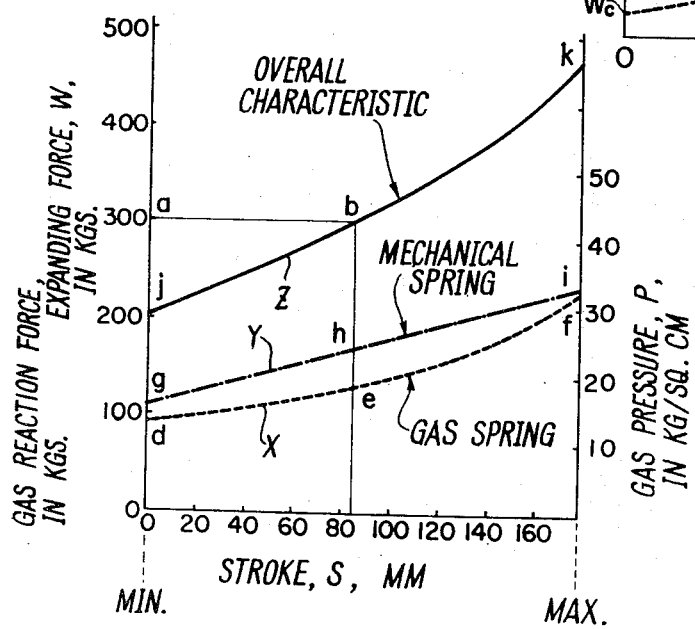
FIG. 7 is an example of a S-W characteristic curve of the telescopic suspension unit of the invention, wherein, however, those of the mechanical spring and the gas spring are additionally illustrated for reference.

The representative operation of all the foregoing embodiments will be described hereinunder more specifically by reference to FIG. 7 showing a combined chart, illustrating several performance curves.

In this chart, the gas reaction force, the gas pressure, P, the mechanical spring force and the overall load-bearing force, W, are plotted against the piston stroke, S.

The curve X extending from d through e to f is that for the gas spring alone. The next curve Y extending from g through h to i is that for the mechanical spring 25 only.

The third curve Z extending from j through b to k is a synthetic curve obtained by the addition the foregoing two curves X and Y. This curve Z corresponds to the desired load-bearing one.

The broken line a-b-c represents the neutral position of the suspension unit; the points e and h correspond to the neutral points.

As seen, the gas pressure force amount to about 130 kgs., while the mechanical spring will provide a force of about 170 kgs., the synthetic force of the both amounting to about 300 kgs. The corresponding gas pressure amounts to 18.5 kg./cm$^2$.

In the following, several main advantages of the invention will be summarized briefly.

1. The pressure of the sealed-in gas can be selected to a not-so-much high valve as conventionally employed with benefit of the employment of substantially weaker mechanical suspension spring which will provide a simpler construction of necessary sealing means, and a least variation in the S-W characteristic curve of the suspension unit caused by outside temperature fluctuation.

2. Since the cushioning gas medium is sealed into a most insidely positioned confining space or chamber of the suspension unit so that a possibility of gas leakage will be supressed to a possible minimu, especially with use of a gas-liquid separator such as flowting piston, bellows, separating means, in this way, the shock-absorving performance of this suspension unit can be substantially proved over the prior art comparative unit.

3. The employment of a larger diameter telescopic rod, providing a large cross-sectional area, will provide an improved resistance to outside bending moments encountered in the use of the suspension unit.

4. By the provision of the insidely sealed-in working liquid always kept pressurized by the sealed cushioning gas medium, otherwise frequently encountered fear of the cavitation can substantially be avoided, especially with, additionally, use of the separator piston or the like means. In this way, aeration can be prevented at the same time. Easy transportation of the unit can also be assured.

5. The overall structure and assembly ring unit can be highly simplified over the conventional comparative suspension unit.

6. By modifing either or both of the pressure and volume of the sealed-in gas medium, the non-linear characteristic performance of the suspension unit can be modified as desired to a certain degree and in a more easy way. Therefore, the operating performance of the suspension unit can be adjusted in a simple way to the occasional chassis height and running condition of the vehicle which is fitted with the present suspension unit.

What is claimed is:

1. A combined hydraulic and mechanical suspension unit comprising, a hydraulic cylinder, a hollow rod telescopically movable within said cylinder, the outer surface of said hollow rod being in spaced relation to the inner surface of said cylinder, said hydraulic cylinder being closed at one end, sealing means located at the opposite end of said hollow cylinder between said cylinder and the outer surface of said hollow rod to define a fluid-tight chamber within said cylinder and said rod, said sealing means forming a first rod guide for said hollow rod, a second rod guide positioned between said hydraulic cylinder and said hollow rod between the ends of said hydraulic cylinder, said second rod guide being fixedly attached to the inside wall surface of said cylinder and slideably engaging the exterior surface of said hollow rod, said second rod guide having a plurality of openings therethrough for establishing fluid communication with the spaces formed within said cylinder on each side of said second rod guide, damping means attached to the end of said hollow rod within said cylinder to allow controlled fluid flow between the interior of said cylinder and the interior of said rod, said damping means including a closure plate having two passages extending therethrough and spring biased valve means in each passage operating in reverse flow relation to each other, separator means contained within the interior of said hollow rod for dividing the interior into two chambers, one of said chambers communicating with the interior of said cylinder through said damping means, the end of said hollow rod extending outwardly of the cylinder having a valve assembly located therein, said valve assembly communicating with the second of said chambers in said hollow rod, said valve assembly adapted for connection to an external gas pressure source for selectively supplying and removing pressurized gas from the second of said chambers in said hollow rod, whereby, the second chamber may be pressurized with gas to a predetermined pressure value for controlling the damping action of said suspension unit.

2. A suspension unit as set forth in claim 1, wherein said separator means comprises a piston slideably contained within the interior of said hollow rod in sealing engagement with the interior surface thereof for defining said two chambers within said hollow rod.

3. A suspension unit as set forth in claim 1, wherein said separator means comprises bellows means secured to said damping means and extending upwardly into the hollow interior of said rod to form said two chambers therein, wherein hydraulic fluid passing through said damping means enters said bellows means is maintained out of contact with a gas in the second chamber in said rod.

4. A combined hydraulic and mechanical suspension unit comprising, a hydraulic cylinder, a hollow rod telescopically movable within said cylinder, the outer surface of said hollow rod being in spaced relation to the inner surface of said cylinder, said hydraulic cylinder being closed at one end, sealing means located at the opposite end of said hollow cylinder between said cylinder and the outer surface of said hollow rod to define a fluid-tight chamber within said cylinder and said rod, said sealing means forming a first rod guide for said hollow rod, a second rod guid positioned between said hydraulic cylinder and said hollow rod between the ends of said hydraulic cylinder, said second rod guide being fixedly attached to the inside wall surface of said cylinder and slideably engaging the exterior surface of said hollow rod, said second rod guide having a plurality of openings therethrough for establishing fluid communication with the spaces formed within said cylinder on each side of said second rod guide, damping means attached to the end of said hollow rod within said cylinder to allow controlled fluid flow between the interior of said cylinder and the interior of said rod, said damping means includes a closure plate having two passages extending therethrough and spring biased valve means in each passage operating in reverse flow relation to each other.

5. A combined hydraulic and mechanical suspension unit according to claim 4 further comprising separator means contained within the interior of said hollow rod for dividing the interior into two chambers, one of said chambers communicating with the interior of said cylinder through said damping means.

6. A suspension unit as set forth in claim 5, wherein said separator means comprises a piston slideably contained within the interior of said hollow rod in sealing engagement with the interior surface thereof for defining said two chambers within said hollow rod.

7. A suspension unit as set forth in claim 5, wherein said separator means comprises bellows means secured to said damping means and extending upwardly into the hollow interior of said rod to form said two chambers therein, wherein hydraulic fluid passing through said damping means enters said bellows means and is maintained out of contact with a gas in the second chamber in said rod.

* * * * *

UNITED STATES PATENT OFFICE
CERTIFICATE OF CORRECTION

Patent No. 3,788,433          Dated January 29, 1974

Inventor(s) Teiji Katsumori

It is certified that error appears in the above-identified patent and that said Letters Patent are hereby corrected as shown below:

In The Heading:

The Priority Date Was Omitted. Should be:

--September 20, 1969     Japan..........................74758/1969

Signed and sealed this 18th day of June 1974.

(SEAL)
Attest:

EDWARD M. FLETCHER, JR.
Attesting Officer

C. MARSHALL DANN
Commissioner of Patents